United States Patent
Mishra et al.

(10) Patent No.: US 12,498,875 B2
(45) Date of Patent: Dec. 16, 2025

(54) DYNAMIC GROW VOLUME

(71) Applicant: Rakuten Symphony, Inc., Tokyo (JP)

(72) Inventors: Ashok Kumar Mishra, San Jose, CA (US); Arumugam Nallasivam, Bangalore (IN); Asit Amitab Mishra, Bengaluru (IN)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/249,788

(22) PCT Filed: Jan. 10, 2023

(86) PCT No.: PCT/US2023/060388
§ 371 (c)(1),
(2) Date: Apr. 20, 2023

(87) PCT Pub. No.: WO2024/151306
PCT Pub. Date: Jul. 18, 2024

(65) Prior Publication Data
US 2025/0321692 A1    Oct. 16, 2025

(51) Int. Cl.
G06F 3/06        (2006.01)
G06F 9/455       (2018.01)

(52) U.S. Cl.
CPC .......... *G06F 3/0653* (2013.01); *G06F 3/0608* (2013.01); *G06F 3/0631* (2013.01); *G06F 3/067* (2013.01)

(58) Field of Classification Search
CPC ....................................................... G06F 3/06
See application file for complete search history.

(56) References Cited

U.S. PATENT DOCUMENTS

| | | | |
|---|---|---|---|
| 8,539,197 B1* | 9/2013 | Marshall | G06F 3/0613 711/112 |
| 8,719,415 B1 | 5/2014 | Sirota et al. | |
| 9,280,390 B2 | 3/2016 | Sirota | |
| 9,658,785 B2 | 5/2017 | Brooker | |
| 10,620,839 B2 | 4/2020 | Alatorre | |
| 10,846,137 B2 | 11/2020 | Vallala | |
| 11,165,667 B2 | 11/2021 | Dippenaar | |
| 11,199,976 B2 | 12/2021 | O'Hare | |
| 11,287,974 B2 | 3/2022 | Prahlad et al. | |
| 11,308,035 B2 | 4/2022 | Prahlad | |
| 11,379,254 B1 | 7/2022 | Karumbunathan | |
| 2007/0214338 A1* | 9/2007 | Mizuno | G06F 3/0644 711/170 |

(Continued)

*Primary Examiner* — Khoa D Doan
(74) *Attorney, Agent, or Firm* — David R. Stevens; Stevens Law Group (57) ABSTRACT

Usage of a storage volume is monitored, including monitoring a write frequency and an overwrite frequency for the storage volume. The overwrite frequency may be obtained from garbage collection data for the storage volume. The write frequency and overwrite frequency may be used to obtain a growth rate and predict future usage of the storage volume. Where future usage indicates that expansion of storage allocated to the storage volume is needed, affinity requirements, anti-affinity requirements, and rebalancing reduction are evaluated with respect to the expansion. If expansion satisfies these constraints, the storage volume is locally expanded. Otherwise, the storage volume is relocated to a different storage device.

14 Claims, 6 Drawing Sheets

(56) References Cited

U.S. PATENT DOCUMENTS

| | | | |
|---|---|---|---|
| 2017/0293433 A1* | 10/2017 | Brettell | G06F 3/0607 |
| 2019/0391744 A1 | 12/2019 | Cashman | |
| 2020/0012443 A1* | 1/2020 | Chen | G06F 3/0665 |
| 2021/0174411 A1 | 6/2021 | Van Biljon | |
| 2024/0220137 A1* | 7/2024 | Bhatnagar | G06F 3/0626 |

* cited by examiner

DYNAMIC GROW VOLUME

BACKGROUND

Field of the Invention

This invention relates to dynamically growing storage volumes.

Background of the Invention

Many computing applications require persistent storage. The persistent storage may be in the form of a database, file system, object store, or other format. The persistent storage will be implemented on a storage device such as a hard disk drive, solid state drive, or the like. Many computing applications are also highly dynamic such that the amount of persistent storage required may change over time.

It would be an advancement in the art to provide greater flexibility in the allocation of persistent storage.

SUMMARY OF THE INVENTION

An apparatus includes a computing device including one or more processing devices and one or more memory devices operably coupled to the one or more processing devices. The one or more memory devices store executable code that, when executed by the one or more processing devices, causes the one or more processing devices to monitor usage of a storage volume stored on one or more storage devices. The future usage of the storage volume is predicted and the allocated size of the storage volume is expanded in response to the future usage.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
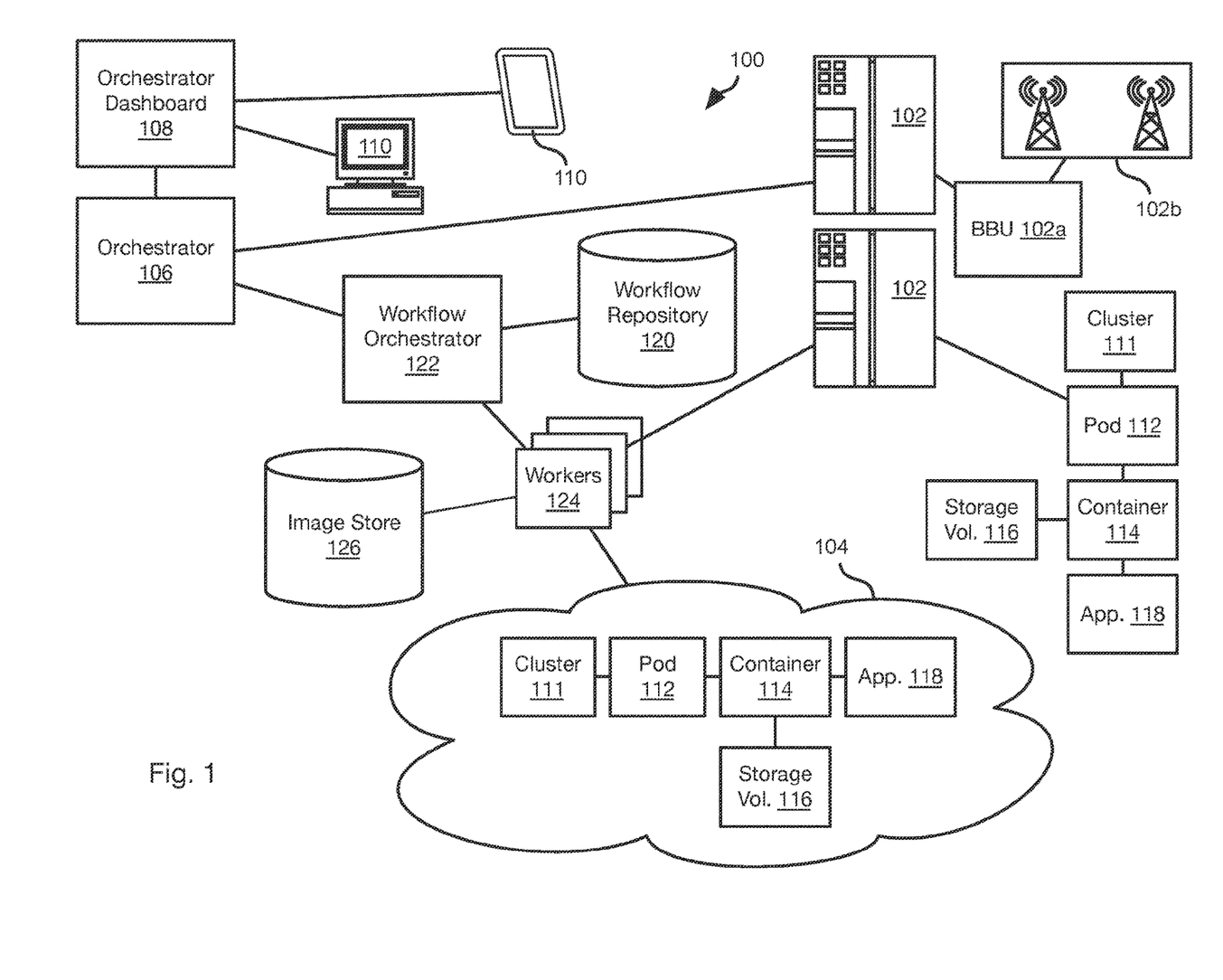
FIG. 1 is a schematic block diagram of a network environment in which storage volumes may be deployed in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 700 of FIG. 7.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102a that provide translation between radio frequency signals output and received by antennas 102b and digital data transmitted and received by the servers 102. For example, each BBU 102a may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QOS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
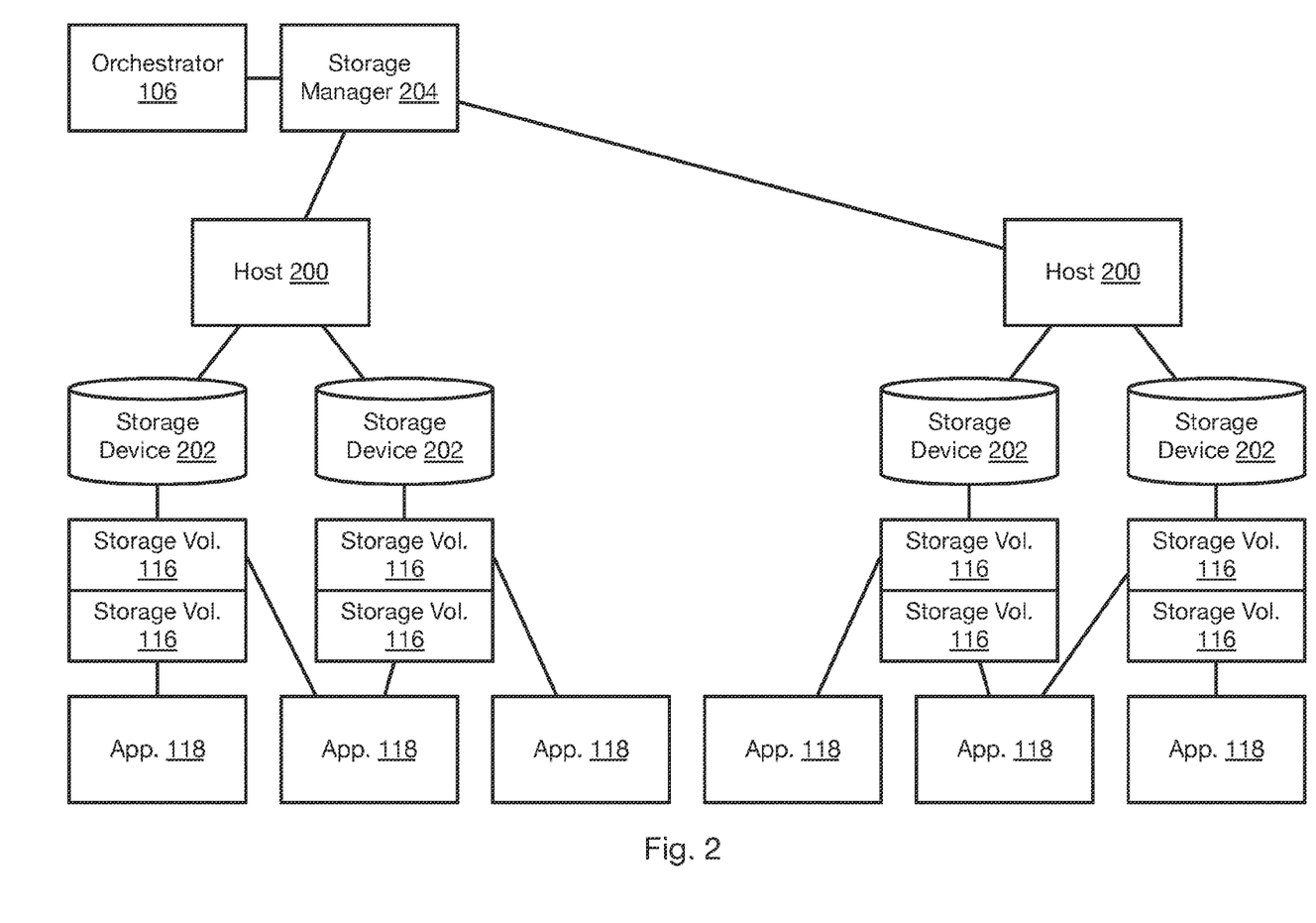
FIG. 2 is a schematic block diagram showing distribution of storage volumes across a plurality of hosts in accordance with an embodiment.

Referring to FIG. 2, a host 200 may be a server 102, a unit of computing resources on the cloud computing platform 104, a virtual machine, or other computing device. A host 200 may have one or more storage devices 202 mounted thereto. Each storage device 202 may be implemented as a hard disc drive (HDD), solid state drive (SSD), or other type of persistent storage device. A storage device 202 may be physically mounted to a host 200 or may be coupled to the host 200 by a network.

A storage device 202 may host one or more storage volumes 116, i.e. segments, files, objects, or other data belonging to a storage volume 116 is stored on the storage device 202. The application instances 118 may access the storage volumes 116 in order to write data to and read data from the storage volumes 116. Multiple application instances 118 may access the same storage volume 116 and an application instance 118 may access multiple storage volumes 116 on multiple hosts. An application instance 118 may execute on the same host 200 to which a storage volume 116 is mounted or may execute on a different host. A storage volume 116 accessed by an application instance 118 may be mounted to a container 114 executing the application instance 118 as a local storage device or as a remote (e.g., network file system (NFS), server message block (SMB)), or other type of storage device.

The allocation of storage on the storage devices 202 to storage volumes 116 may be performed by a storage manager 204 that is an agent of the orchestrator 106 and/or a module executing within the orchestrator 106. The methods disclosed herein may be performed by the storage manager 204, the orchestrator 106, or some other component.

A storage volume 116 may be devices into smaller units, e.g., slices, that may be managed independently, including being stored on different storage devices 202 that may be mounted to different hosts 200. In the following description, a storage volume is described as a single entity residing on a single storage device 202 of a single host 200 with the understanding that slices of a storage volume 116 may be managed in the same manner.

Figure 3:
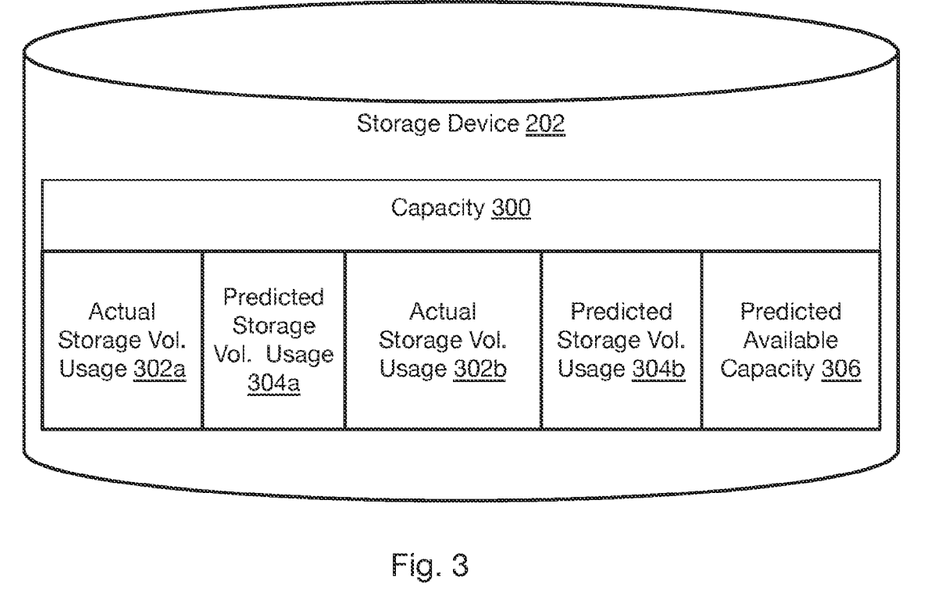
FIG. 3 is schematic diagram showing the usage of storage in a storage device in accordance with an embodiment.

Referring to FIG. 3, a storage device 202 may have a given capacity 300. The storage volumes 116 allocated to the storage device 202 may have actual storage volume usages 302a, 302b indicating the amount of data currently stored for each storage volume 116. The actual usage may be smaller than a capacity of the storage device 202 that is reserved or otherwise allocated for a given storage volume 116.

The usage of each storage volume 116 may be monitored. In particular, the number of reads, writes, and overwrites and the amount of data of each type of operation may be monitored and used to obtained predicted storage volume usage 304a, 304b of each storage volume 116. The predicted usage may be a predicted amount by which the data stored in the storage volume 116 will increase at a future time if growth continues at a current rate, e.g., within the next hour, 24 hours, or some other interval. The capacity 300 in excess of the actual storage volume usages 302a, 302b and the predicted storage volume usages 304a, 304b is the predicted available capacity 306 of the storage device 202.

Figure 4:
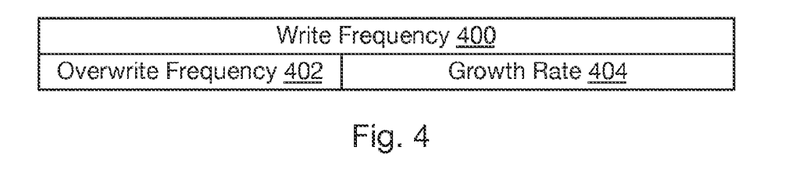
FIG. 4 is a schematic diagram showing write, overwrite collection, and growth frequency of a storage volume in accordance with an embodiment.

Referring to FIG. 4, for example, a write frequency 400 may be calculated, such as a value in the form of units of storage per unit time (e.g., megabytes (MB) per second, or some other units). For example, the size of blocks of data written to a storage volume 116 in a time window may be summed (and possibly divided by the time window) to obtain the write frequency 400.

An overwrite frequency 402 may also be calculated. Some write operations may be overwrite a file or be addressed to the same address within a storage volume that was written in a previous write operation. A storage volume 116 may be implemented as an "append only" storage volume in which all writes are appended to previously-stored data and annotated with metadata indicating a logical address or file to which the data is written. Likewise, many NAND flash storage devices use a similar approach whereby new data is written to a new location and overwritten is marked as invalid.

In either case, a garbage collection process is then performed in which segments of storage (or blocks of memory in the case of a NAND flash storage device) are made free to be overwritten. For example, a segment of storage storing only data annotated with logical addresses that are referenced in subsequently written segments may be marked as free to be overwritten. Likewise, a first segment of storage including overwritten and non-overwritten data may be garbage collected by rewriting the non-overwritten data to a second segment of storage and marking the first segment of storage as free to be overwritten. Where garbage collection is performed, any garbage collection known in the art may be performed. In some implementations, the garbage collection process is performed by a background process that may output data describing storage that is identified as free. The rate at which storage is identified as free (e.g., units of storage marked free per unit of time) may be calculated as the overwrite frequency 402.

The difference between the write frequency 400 and the overwrite frequency 402 is referred to herein as the growth rate 404. The growth rate 404 of a storage volume 116 multiplied by a time window may be used to obtain the predicted storage volume usage 304a, 304b. Alternatively, a more sophisticated approach that can deal with fluctuations in the growth frequency may be used to obtain more accurate predicted storage volume usage 304a, 304b.

Read operations do not affect the predicted available capacity 306 of the storage device 202 but may be processed in a similar way with respect to the available throughput of the storage device 202. The read frequency, e.g., units of data read per unit time, for a storage volume may be calculated. The available read capacity 306 may then be calculated as the difference between the read capacity of the storage device 202 and the sum of the read frequencies of all storage volumes stored in the storage device 202.

Figure 5:
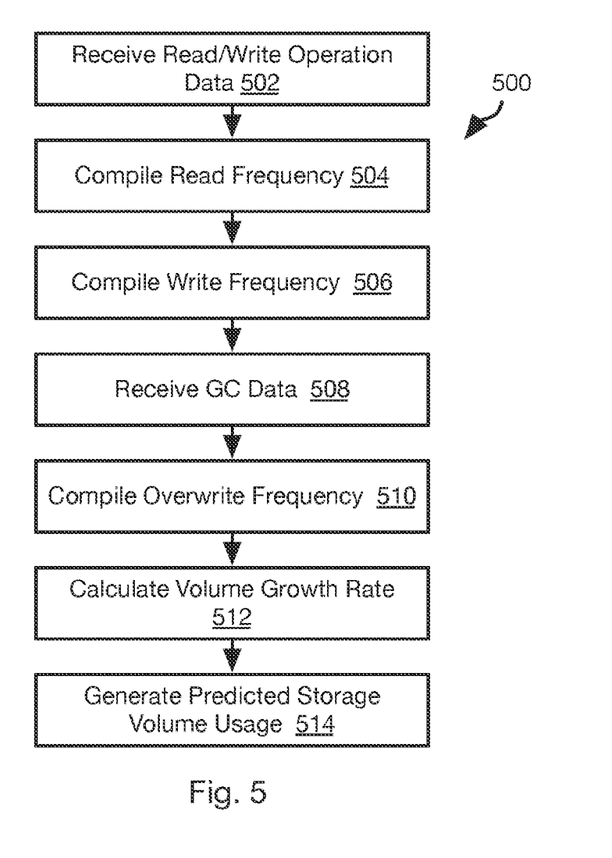
FIG. 5 is a process flow diagram of a method for characterizing usage of a storage volume in accordance with an embodiment.

FIG. 5 illustrates a method 500 that may be performed to obtain the predicted storage volume usage 304a, 304b for a storage volume. The method 500 may include receiving 502 read and write operation data. For example, each storage volume 116 (e.g., the host 200 of each storage volume 116) may generate a log of read and write operations either as individual operations or an aggregation of data for a plurality of read and write operations. The read and write operation may include, for an individual operation or a collection of operations, the operation type (read/write) and the amount of data processed according to the operation.

The method 500 may include compiling 504 a read frequency for each storage volume 116. For example, for each operation included in the read and write operation data, the storage volume 116 referenced by the operation may be obtained by some or all of (a) mapping a process identifier referenced by the operation to the process implementing the storage volume or (b) mapping a physical address referenced by the operation to the storage volume 116 to which a block of storage including the physical address is allocated. The amounts of data read in the read operations for a storage volume 116 within a time window may then be summed and divided by the duration of the time window within which the read operations were received to obtain the read frequency.

The method 500 may include compiling 506 a write frequency for each storage volume 116. For example, for each write operation included in the read and write operation data, the storage volume 116 referenced by the operation may be obtained as described above. The amounts of data written in the write operations for a storage volume 116 within a time window may then be summed and divided by the duration of the time window within which the write operations were received to obtain the write frequency.

The method 500 may include receiving 508 garbage collection data and compiling 510 an overwrite frequency. For example, the amount of storage marked as free by a garbage collection process within a time window may be summed and divide by the duration of the time window to obtain the overwrite frequency. Alternatively, where data from a second write operation referencing an address will overwrite data from a first operation written to the address, the overwrite frequency may be compiled 510 without using garbage collection. The overwrite frequency may be calculated as the sum of the amounts of data from the write operations that overwrite previously written data within a time window divided by the duration of the time window.

The method 500 may include calculating 512 a growth rate for the storage volume 116, such as by subtracting the overwrite frequency from the write frequency. The growth rate may then be used to generate 514 a predicted storage volume usage. For example, the growth rate may be multiplied by a duration, such as one minute, one hour, one day, or some other duration. The growth rate may also be subject to more sophisticated analysis. For example, the growth rate may be measured periodically, e.g., every second, every two seconds, or at some other period to obtain a time series of growth rates. The time series may then be processed such as by performing some or all of low pass filtering to remove noise, performing curve fitting, identifying trends in the growth rate, or other technique. The result of processing of the time series data may be a growth rate estimate for use in calculating the predicted storage volume usage or the predicted storage volume usage itself. Generating the predicted storage volume usage 514 may further include processing the time series data and/or any of the read frequency, write frequency, overwrite frequency, or the data used to obtain the read frequency, write frequency, overwrite frequency using a machine learning model trained to generate the predicted storage volume usage.

Figure 6:
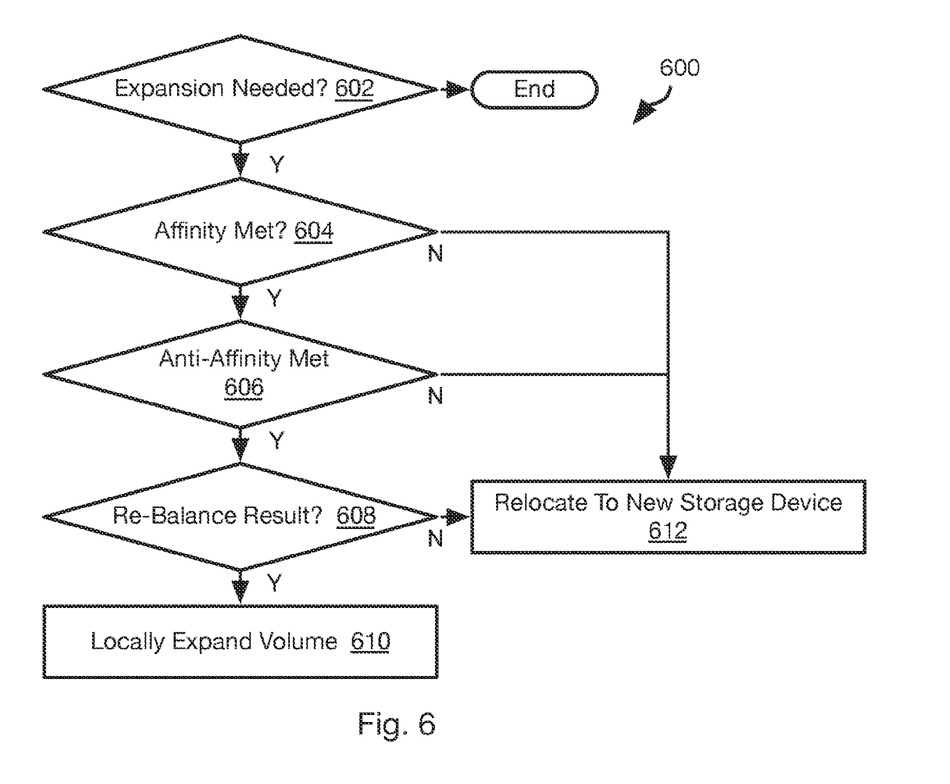
FIG. 6 is a process flow diagram of a method for expanding a storage volume in accordance with an embodiment.

FIG. 6 illustrates a method 600 that may be performed with respect to a storage volume 116. The method 600 may be used to determine whether to expand the storage volume 116, relocate the storage volume, or take no action. The method 600 may be preceded by performing the method 500 with respect to the storage volume 116 such that a predicted storage volume usage is available for each storage volume of the storage volume 116.

The method 600 may include evaluating 602 whether expansion of a storage volume is needed. For example, if the sum of the actual storage volume usage 302a and the predicted storage volume usage 304a for a storage volume 116 is greater than the allocated storage amount for the storage volume 116, expansion may be found 602 to be needed.

The method 600 may include evaluating 604 whether expanding the storage volume 116 would violate any affinity requirements referencing the storage volume 116. An affinity requirement is a requirement that a component be within a specified proximity to another component, e.g., same host 200, same chassis, same rack, same data center, same cloud region, or some other defined proximity. Expanding a first storage volume 116 may potentially violate an affinity requirement by requiring displacement of a second storage volume 116 that is required to be on the same storage device 202 as the first storage volume 116. Expanding a first storage volume 116 may require portions of the first storage volume 116 to be placed on two different storage devices 202 which may itself violate an affinity requirement or may violate an affinity requirement due to one portion of the first storage volume 116 being on a different storage device 202 than a second storage volume 116. Expanding a first storage volume 116 may require portions of the first storage volume 116 to be placed on two different partitions of a storage device 202 which may itself violate an affinity requirement or may violate an affinity requirement due to one portion of the first storage volume 116 being on a different partition of the storage device 202 than a second storage volume 116.

The method 600 may include evaluating 606 whether expanding the storage volume 116 would violate any anti-affinity requirements referencing the storage volume 116. An anti-affinity requirement is a requirement that a component have a specified separation from another component, e.g., different host 200, different chassis, different rack, different data center, different cloud region, or some other defined separation. Expanding a first storage volume 116 may potentially violate an anti-affinity requirement by requiring displacement of a second storage volume 116 to a storage device storing a third storage volume 116 that has an anti-affinity requirement with respect to the second storage volume. Expanding a first storage volume 116 may require portions of the first storage volume 116 to be placed on two different storage devices 202 which may violate an anti-affinity requirement due to one portion of the first storage volume 116 being on the same storage device 202 as a second storage volume 116. Expanding a first storage volume 116 may require portions of the first storage volume 116 to be placed on two different partitions of a storage device 202 which may itself violate an affinity requirement due to one portion of the first storage volume 116 being on the same partition of the storage device 202 as a second storage volume 116.

The method 600 may include evaluating 608 whether expanding the storage volume 116 would require re-balancing of the storage volumes 116 of a cluster 111. Rebalancing is a process by which a plurality of storage volumes 116 are assigned to a plurality of hosts 200 and storage devices 202 of hosts based on size, read frequency, write frequency, affinity requirements, anti-affinity requirements and possibly other requirements. During rebalancing, storage volumes 116 are assigned to hosts 200 based on capacity (storage, read throughput, and write throughput) to approximately meet quality of service requirements (e.g., read and write latency) for each storage volume 116. If expanding of a first storage volume 116 would render one or more second storage volumes 116 unable to function properly, then the result of step 608 is negative. In a first example, if expanding the first storage volume 116 would cause a storage device 202 to have insufficient capacity to receive the predicted storage volume usage of one or more second storage volumes, then expanding would result in the need for rebalancing. In a second example, expanding a storage volume 116 on a storage device that does have sufficient capacity for the expansion as well as the predicted storage volume usage of other storage volumes 116 on the same storage device 202 may advantageously reduce or delay the need for rebalancing. In a third example, relocating a storage volume 116 from a first storage device 202 to a second storage device 202 of another host 200 may reduce the need for rebalancing in some scenarios inasmuch as the remaining storage volumes on the first storage device will now have more capacity available to them.

In view of the preceding example, the result of step 608 is positive if expanding the storage volume 116 will delay the need for rebalancing and is negative if expanding the storage volume 116 will create a need for rebalancing.

If the results of the evaluations of all of steps 602, 604, 606, and 608 are positive, then the storage volume 116 is locally expanded 610, i.e., the amount of capacity allocated to the storage volume on the storage device hosting the storage volume 116 is increased, such as by the predicted storage volume usage 304a of the storage volume 116 or some multiple thereof.

If the results of the evaluations of any of steps 602, 604, 606, and 608 is negative, the storage volume 116 is relocated 612 to a new storage device 202 of the same host 200 or a different host 200 that has available capacity for the actual storage volume usage 302a and predicted storage volume usage 304a (or some multiple thereof) of the storage volume 116. The storage volume 116 may be relocated 612 such that the new storage device, and possibly new host, satisfies affinity, anti-affinity, or other constraints.

Figure 7:
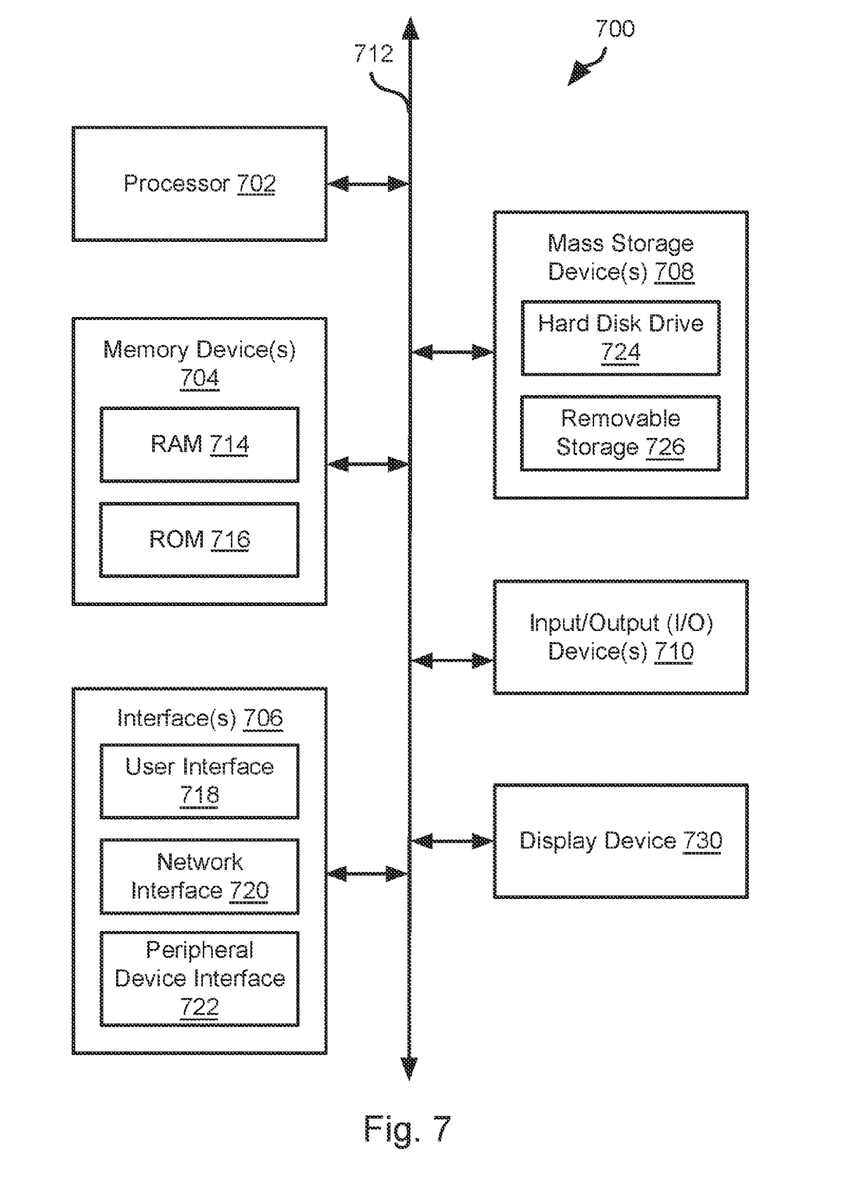
FIG. 7 is a schematic block diagram of an example computing device suitable for implementing methods in accordance with embodiments of the invention.

FIG. 7 is a block diagram illustrating an example computing device 700. Computing device 700 may be used to perform various procedures, such as those discussed herein. The servers 102, orchestrator 106, workflow orchestrator 122, cloud computing platform 104, and storage manager 204 may each be implemented using one or more computing devices 700. The orchestrator 106, workflow orchestrator 122, and storage manager 204 may be implemented on different computing devices 700 or a single computing device 700 may execute all of the orchestrator 106, workflow orchestrator 122, and storage manager 204.

Computing device 700 includes one or more processor(s) 702, one or more memory device(s) 704, one or more interface(s) 706, one or more mass storage device(s) 708, one or more Input/output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, I/O device(s) 710, and display device 730 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
a computing device including one or more processing devices and one or more memory devices operably coupled to the one or more processing devices, the one or more memory devices storing executable code that, when executed by the one or more processing devices, causes the one or more processing devices to:
monitor usage of a storage volume stored on one or more storage devices by:
monitoring a write frequency of the storage volume;
monitoring an overwrite frequency of the storage volume; and
calculating a growth rate as a difference between the write frequency and the overwrite frequency;
predict future usage of the storage volume; and
expand an allocated size of the storage volume in response to the future usage.

2. The apparatus of claim 1, wherein the executable code, when executed by the one or more processing devices, further causes the one or more processing devices to calculate the overwrite frequency from garbage collection data for the storage volume.

3. The apparatus of claim 1, wherein the executable code, when executed by the one or more processing devices, further causes the one or more processing devices to predict the future usage of the storage volume as a function of the growth rate.

4. The apparatus of claim 1, wherein the executable code, when executed by the one or more processing devices, further causes the one or more processing devices to expand the allocated size of the storage volume in response to the future usage only where expanding the allocated size of the storage volume does not violate an affinity requirement.

5. The apparatus of claim 1, wherein the executable code, when executed by the one or more processing devices, further causes the one or more processing devices to expand the allocated size of the storage volume in response to the future usage only where expanding the allocated size of the storage volume does not violate an anti-affinity requirement.

6. The apparatus of claim 1, wherein the executable code, when executed by the one or more processing devices, further causes the one or more processing devices to expand the allocated size of the storage volume in response to the future usage only where expanding the allocated size of the storage volume reduces a need for rebalancing of a plurality of storage volumes including the storage volume.

7. The apparatus of claim 1, wherein the executable code, when executed by the one or more processing devices, further causes the one or more processing devices to expand the allocated size of the storage volume in response to the future usage only where expanding the allocated size of the storage volume all of:
does not violate an affinity requirement;
does not violate an anti-affinity requirement; and
reduces a need for rebalancing of a plurality of storage volumes including the storage volume.

8. A method comprising:
monitoring, by a computing device, usage of a storage volume stored on one or more storage devices by:
monitoring a write frequency of the storage volume;
monitoring an overwrite frequency of the storage volume; and
calculating a growth rate as a difference between the write frequency and the overwrite frequency;
predicting, by the computing device, future usage of the storage volume; and
expanding, by the computing device, an allocated size of the storage volume in response to the future usage.

9. The method of claim 8, further comprising calculating the overwrite frequency from garbage collection data for the storage volume.

10. The method of claim 8, further comprising predicting the future usage of the storage volume as a function of the growth rate.

11. The method of claim 8, further comprising expanding the allocated size of the storage volume in response to the future usage only where expanding the allocated size of the storage volume does not violate an affinity requirement.

12. The method of claim 8, further comprising expanding the allocated size of the storage volume in response to the future usage only where expanding the allocated size of the storage volume does not violate an anti-affinity requirement.

13. The method of claim 8, further comprising expanding the allocated size of the storage volume in response to the future usage only where expanding the allocated size of the storage volume reduces a need for rebalancing of a plurality of storage volumes including the storage volume.

14. The method of claim 8, further comprising expanding the allocated size of the storage volume in response to the future usage only where expanding the allocated size of the storage volume all of:
does not violate an affinity requirement;
does not violate an anti-affinity requirement; and
reduces a need for rebalancing of a plurality of storage volumes including the storage volume.

* * * * *